Jan. 25, 1955     S. ELSKY     2,700,215
RAZOR
Filed May 21, 1951

INVENTOR
STANLEY ELSKY
By:
Nauetius, Lahe &Co.
AGENTS

United States Patent Office 2,700,215
Patented Jan. 25, 1955

2,700,215

RAZOR

Stanley Elsky, London, England

Application May 21, 1951, Serial No. 227,460

Claims priority, application Great Britain May 23, 1950

4 Claims. (Cl. 30—43)

This invention relates to razors or hair clipping devices.

According to the present invention there is provided a razor or hair clipping device comprising a handle, a casing telescopically slidable with respect to said handle against the action of a spring, a grating at the free end of said casing, said grating being effectively secured to the casing and possessing a plurality of small holes through which hairs to be cut can pass, a shaft rotatably supported within said casing, means for causing rotation of said shaft with respect to the casing when the casing and handle are moved telescopically with respect to each other, and a cutter mounted so that it is rotated when said shaft rotates, the arrangement being such that when the grating is held against the face and the handle is displaced toward and/or away from the face, hairs projecting through the grating are cut by the cutter.

For a better understanding of the invention and the manner of carrying the same into effect reference will now be made to the accompanying drawing, in which.

Figure 1:
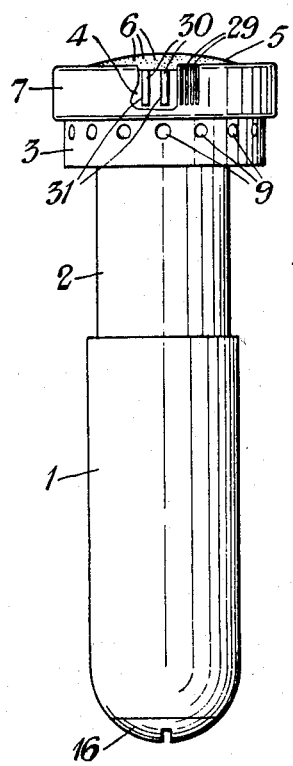
Figure 1 is a side elevation, partly cut away, of a razor or hair clipping device.
Figure 2:
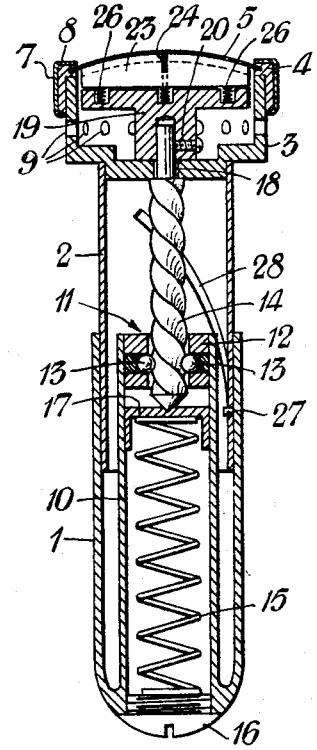
Figure 2 is a cross-sectional elevation of the razor of Figure 1.

The razor has a tubular handle 1 which is closed at the lower end and open at the top. A tubular casing 2 is slidably entered into the open end of the handle 1. The casing 2 is open at the lower end and the upper end is closed by a hollow plug 3 which is a press fit in the casing 2. An annular ring 4 carrying a grating 5 is pressed on the upper end of the plug 3. The grating 5 is very thin and possesses a plurality of small holes 6 and/or slots (not shown). A thin annular ring 7 is rotatably mounted on the ring 4, the ring 7 having a thin flange 8 which overlays the ring 4 and hence the edge of the grating 5. The flange 8 is in close proximity to the grating 5. The wall of the plug 3 has a number of holes 9 for enabling cut hair to be blown from the interior of the plug.

A hollow cylindrical member 10 formed integrally with the handle 1 extends from the closed end of the handle towards the casing 2. The cylindrical member 10 is co-axial with the handle 1 and the casing 2. A nut 11, formed by a plug 12 having two balls 13 secured therein, is gripped in the free end of the cylindrical member 10. A quick threaded shaft 14 is passed through the nut 11 and projects into the interior of the hollow cylindrical member 10. A spring 15 is located within the cylindrical member 10, one end of the spring abutting against a screwed cap 16 which closes the lower end of the handle 1 and the other end abutting against a piston-like member 17 slidable in the member 10 and on which the shaft 14 bears.

Figure 3:
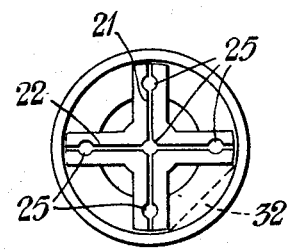
Figure 3 is a plan view of the razor of Figure 1, some of the parts having been removed.

The upper end of the shaft 14 protrudes through a hole 18 in the plug 3 and has a cutter holder 19 secured thereon by a set screw 20. The cutter holder 19 has two slots 21, 22 (Figure 3) therein and two cutter blades 23, 24 are laid in the slots 21, 22 respectively. Circular sectioned recesses 25 are formed in the holder 19, each recess being located immediately beneath one of the blades 23, 24. Springs 26 are placed in the recesses 25, the lower ends of the springs abutting against the bottoms of the recesses and the upper ends of the springs urging the blades 23, 24 against the grating 5.

The handle 1 has an inwardly directed lug 27 which rides in a helical slot 28 in the casing 2.

The ring 7 has a number of narrow vertically disposed slots 29 (Figure 1) and the periphery of the ring 4 has vertical slots 30 cut therein to form cutting edges 31 around the periphery of the ring 4.

The flange 8 of the ring 7 has a segmental lip 32 extending over the grating 5 in close proximity to the latter. The edge of the lip 32 is indicated by the dotted line in Figure 3.

The razor described above is used in the following manner. The handle 1 is held substantially normal to the face, the grating 5 being in contact with the face. The handle 1 is pushed towards the face and the casing 2 slides into the handle 1. In so sliding the casing 2, together with the plug 3 and grating 5, is caused to rotate with respect to the handle 1 on account of the interaction of the lug 27 and the helical groove 28. This causes the grating 5 to rotate on the face (the ring 7 remaining stationary) so that the hairs of the beard enter the small holes in the grating 5. As the casing 2 slides into the handle 1 the shaft 14 is pushed into the nut 11 against the action of the spring 15 and is thereby caused to rotate with respect to the handle 1. The thread on the shaft 14 and the slot 28 are formed so that the shaft 14 and casing 2 turn in opposite directions when the casing 2 moves into the handle 1. Hence the cutting blades 23, 24 rotate with respect to the grating 5 and hairs projecting through the grating 5 are cut by the blades 23, 24.

After pressing the handle 1 towards the face, the spring 15 is allowed to reassert itself by withdrawing the handle 1 slightly from the face. The blades 23, 24 and casing 2 again rotate and the cutting operation is continued.

The cutting edges 31 are used for trimming the moustache. The flanged ring 7 is held stationary with the slots 29 positioned so that the hairs of the moustache project therethrough. Movement of the handle 1 towards the casing 2 causes the ring 4 to rotate relative to the ring 7 and hairs projecting through the slots 29 are cut.

The segmental lip 32 serves to prevent the cutting of hairs abutting thereagainst. The lip 32 has a straight edge thus enabling shaving to be carried out leaving a straight demarcation line between shaved and unshaved portions.

Razors constructed as described above can be used for performing so-called "dry shaving."

I claim:

1. A razor or hair clipping device comprising a handle, a casing telescopically slidable with respect to said handle against the action of a spring, a grating at the free end of said casing, said grating being effectively secured to the casing and possessing a plurality of small apertures through which hairs to be cut can pass, a shaft rotatably supported within said casing, means for causing rotation of said shaft with respect to the casing when the casing and the handle are moved telescopically with respect to each other, a cutter mounted so that it is rotated when the shaft rotates, and a pin and helical slot connection as between the casing and the handle for causing rotation of the casing with respect to the handle when the casing and handle are pushed together, the arrangement being such that when the grating is held against the face and the handle is displaced towards the face the grating rotates on the face and the cutter rotates with respect to the grating, whereby hairs projecting through the grating are cut by the cutter.

2. A razor or hair clipping device as claimed in claim 1, wherein the grating is circular, the grating being encircled by a ring which is supported by the casing and which is freely rotatable relative to the latter, said ring having a flange overlaying the edge portion of the grating, the outer surface of the flange being close to the outer surface of the grating.

3. A razor or hair clipping device as claimed in claim 2, wherein the ring has a straight edged lip overlaying a segment of the outer surface of the grating.

4. A razor or hair clipping device comprising a handle, a casing telescopically slidable with respect to said handle, spring means resisting telescoping of said handle and casing, a grating secured at the free end of said casing for rotation with the latter and having a plurality of small apertures through which hairs to be cut can extend, a threaded shaft rotatably supported in said casing, nut means carried by said handle and threadably engaging said shaft to produce rotation of the latter when said casing and handle are moved telescopically with respect to each other, a cutter on said shaft for rotation with the latter against a surface of said grating, and interengaging helical slot and pin means on said handle and casing to cause rotation of the latter relative to said handle in the direction opposite to the direction of rotation of said shaft when said handle and casing are moved telescopically relative to each other so that said grating and cutter are rotated in opposite directions by such telescopic movement of the handle and casing.

References Cited in the file of this patent

UNITED STATES PATENTS

| Number | Name | Date |
|---|---|---|
| 85,460 | Makay | Dec. 29, 1868 |
| 590,929 | Yougken | Sept. 28, 1897 |
| 1,960,089 | Rabb | May 22, 1934 |
| 2,119,021 | Moskovics | May 31, 1938 |
| 2,167,833 | Gold | Aug. 1, 1939 |
| 2,212,856 | Dalkowitz | Aug. 27, 1940 |
| 2,213,872 | Trachtenberg | Sept. 3, 1940 |
| 2,280,052 | Bahr | Apr. 21, 1942 |
| 2,283,834 | Van Dam | May 19, 1942 |